United States Patent [19]

Lane

[11] 4,390,946
[45] Jun. 28, 1983

[54] LOOKAHEAD ADDRESSING IN A PIPELINE COMPUTER CONTROL STORE WITH SEPARATE MEMORY SEGMENTS FOR SINGLE AND MULTIPLE MICROCODE INSTRUCTION SEQUENCES

[75] Inventor: Thomas A. Lane, New Brighton, Minn.

[73] Assignee: Control Data Corporation, Minneapolis, Minn.

[21] Appl. No.: 198,888

[22] Filed: Oct. 20, 1980

[51] Int. Cl.³ .......................... G06F 9/22; G06F 9/28; G06F 9/38; G06F 9/42
[52] U.S. Cl. ..................................... 364/200; 365/230
[58] Field of Search ... 364/200 MS File, 900 MS File; 365/230

[56] References Cited

U.S. PATENT DOCUMENTS

| | | | |
|---|---|---|---|
| 4,087,857 | 5/1978 | Joyce et al. | 364/200 |
| 4,095,265 | 6/1978 | Vrba | 364/200 |
| 4,155,120 | 5/1979 | Keefer et al. | 364/200 |
| 4,156,279 | 5/1979 | Wilhite | 364/200 |
| 4,179,731 | 4/1979 | Yamazaki | 364/200 |
| 4,179,737 | 12/1979 | Kim | 364/200 |
| 4,307,445 | 12/1981 | Tredennick et al. | 364/200 |
| 4,310,880 | 1/1982 | Gehman | 364/200 |
| 4,320,453 | 3/1982 | Roberts et al. | 364/200 |
| 4,348,724 | 9/1982 | Cushing et al. | 364/200 |

*Primary Examiner*—James D. Thomas
*Assistant Examiner*—Archie E. Williams, Jr.
*Attorney, Agent, or Firm*—William J. McGinnis; Joseph A. Genovese

[57] ABSTRACT

The microinstructions controlling a pipeline processor are held in a control store that is partitioned into two microcode memory banks. The invention can support three modes of sequencing; single microinstruction, sequential multiple microinstructions, and multiple microinstructions with conditional branching. When a conditional branch is performed, the branch not taken path is assumed and if true, the microinstruction following the branch is executed with no delay. If the branch is taken, the guess is purged and following a one clock delay, the branched to microinstruction is executed. The invention supports these sequencing modes at the maximum pipeline rate, since the only logic between registers is the memory chips.

5 Claims, 2 Drawing Figures

LOOKAHEAD ADDRESSING IN A PIPELINE COMPUTER CONTROL STORE WITH SEPARATE MEMORY SEGMENTS FOR SINGLE AND MULTIPLE MICROCODE INSTRUCTION SEQUENCES

RELATED PATENT APPLICATIONS

The disclosure of the present application is related to the disclosure of a co-pending patent application entitled PLURAL MICROCODE CONTROL MEMORY, Ser. No. 077,954, filed Sept. 24, 1979, inventor L. M. Kruger and owned by the same assignee as the present application. The earlier filed co-pending application is prior art as to the present application.

BACKGROUND OF THE INVENTION

This invention relates to a system for implementing microprogrammed control in a very high speed computer. More particularly, this invention relates to a microcode sequencing technique (for example, conditional branching) done in such a way as to maximize the pipeline execution rate. The computer described is presumed to be a pipeline structure in which a single phase clocking system is used to clock the pipeline. The instruction execution rate is proportional to the clocking rate, thus minimizing the clock cycle time which is critical to achieving maximum performance. The computer utilizes microprogrammed control, thus one of the pipeline segments consists of the microcode control store. A microcode control store is the memory used to store the microinstructions. A microinstruction is the contents of a single control store address and contains the bits used for control. The hardware design must be capable of accessing one microinstruction per clock. This means that the minimum clock cycle time must be at least as long as the access time of the memory chip plus the input and output pipeline registers. Thus, this invention is a system of implementing a microprogrammed control unit in a pipeline computer in which the clock cycle is the minimum described and the clocking rate is at a maximum rate for any given memory chip.

Prior art implementations of such a memory system all have at least one additional logic level between the various registers in the pipeline. These additional logic levels directly increase the clock cycle time period. A typical example is for some control store bits to be used to control the selection of the control store address at the next clock cycle time. In this example, the clock cycle time is computed as: memory access time plus register delay time plus multiplexer select path delay time. These designs all have a decision interval of one clock. That is, the current microinstruction always knows how to address the next microinstruction. The cost of obtaining the decision time of one is the extra gate levels described.

The present invention does not have a guaranteed decision interval of one clock cycle. In most applications, this invention will perform with a decision interval of one clock. This does not mean however that a decision interval of one clock cycle is guaranteed, since no control store bits feed directly back to select the next data for the control store address register. However, the proposed invention will run most of the time with a decision interval of one clock cycle, the only exception being a wrong prediction on a microcode conditional branch.

The use of the microprogrammed control in the computer is to decode instructions. More specifically, opcodes are received from the instruction register and used to generate the specific control signals that cause the instruction to be executed in the computer. In this invention, the microprogrammed control categorizes instructions received into two classes, single microinstructions and multiple microinstructions. A single instruction is one in which only a single microcode instruction is issued to the machine to cause the instruction to be fully executed. A multiple microcode instruction is one in which more than one microcode instruction must be issued to the machine to cause the instruction to be executed.

Once instructions are brought into the microprogrammed control unit, they execute in one of three ways: (1) single microinstructions, (2) sequential multiple microinstructions, and (3) sequential multiple microinstructions with conditional branching instructions. With respect to microcode sequencing, with case 1, the only sequencing required by a microinstruction is to go to the first microinstruction of the next instruction. In case 2, the only sequencing used between microinstructions is increment. In case 3, many types of sequencing are supported, including increment, conditional branch, subroutine call and return, unconditional branch and repeat.

A system according to this invention will handle cases 1 and 2 with a decision interval equal to one clock cycle, since the design will always do a correct lookahead. The system will handle all branches of case 3 with a decision interval of one clock cycle if the branch is not taken and a decision interval of 2 if the branch is taken. This is because the hardware makes a look-ahead guess of the next address. When the guess is correct, the decision interval is 1. When the guess is incorrect, the guess is purged and the correct path is resumed with a decision interval of 2.

In computer applications, most of the instruction microcode is classified as case 1 or 2. The small number of case 3 instructions can be handled efficiently if the branch probabilities are known, which is often the case. Practice of the present invention can come very close to total execution with a decision interval of 1 clock cycle without suffering the additional gate delays required to guarantee a decision time of 1 clock cycle interval.

SUMMARY OF THE INVENTION

In a system according to the invention, the control store is made up of two individual memories, one for single microinstructions and one for multiple microinstructions. The single microinstruction memory is much smaller than the multiple microinstruction memory since no sequencing field bits are required. This has the advantage that both memories may respond more quickly than a single memory of the same size because the internal delays of a small memory are shorter. The multiple microinstruction memory must have a sequencing field to define how to calculate the next control store address. The selection of memories is done by a bit derived from a control device, referred to as the single microinstruction flip-flop which is latched in every time a new instruction is started. This flip-flop defines the instruction as a single or multiple microinstruction and controls the memory select network for the duration of the instruction. This address instruction does not require any gate delay time as a result of hard wiring ANDing requirements and chip enable requirements.

A microprogram control according to the present invention is embedded in a pipeline computer and the microprogram control must therefore meet pipeline control requirements. A first requirement is that the pipeline must be capable of running at the maximum rate of one, single microinstruction per clock cycle. The section of the pipeline which supplies instructions to the microprogram control must have a signal to determine when to advance an instruction and when to stop sending instructions. Since no memory bits can be used directly to do this, because memory bits are immediately latched, a look-ahead technique is used. That is, the pipeline control must be predicted one clock cycle before it is required. For single microinstructions, this is done with the single microinstruction flip-flop in the control store address pipeline rank. This flip-flop bit is a 1 whenever the control store address being read is a single microinstruction. At the next clock cycle, the pipeline will advance such that the microinstruction just read is latched and the first control store address of the next instruction is latched into the control store address register. For multiple microinstructions, the pipeline flow of instruction must stop while the sequence of microinstructions is issued. This is done by the single microinstruction bit being zero during the execution stage. The pipeline flow of instructions is started again by a bit in the sequencing field of the multiple microinstruction. This bit, called the PREXIT bit is set to be a one in the next to the last microinstruction. This look-ahead feature causes the pipeline to start at the correct time to supply the next instruction with no time delay. This is always possible as multiple microinstructions have two or more microinstructions.

The sequencing field of the multiple microinstruction memory is also used to implement a REPEAT and a SYNCHRONIZE function. The REPEAT bit in the sequencing field causes a microinstruction to be repeated or reissued at every instruction cycle to the processor until the condition register shows a true on a tested condition. Then the next instruction is issued in the instruction pipeline to the microcode memory.

Similarly, the sequencing field has another bit called the SYNCHRONIZE bit. This is used in conjunction with conditional branching and the processor operates in the synchronize mode. In this mode, the next microinstruction, which would normally contain the conditional branch, is held or pauses until the specified branch condition information becomes available or valid. This ensures that the microcode doesn't use a branch condition until it is valid. This implementation saves control store locations and results in faster microcode branching.

DESCRIPTION OF THE PREFERRED EMBODIMENT

Figure 1A:
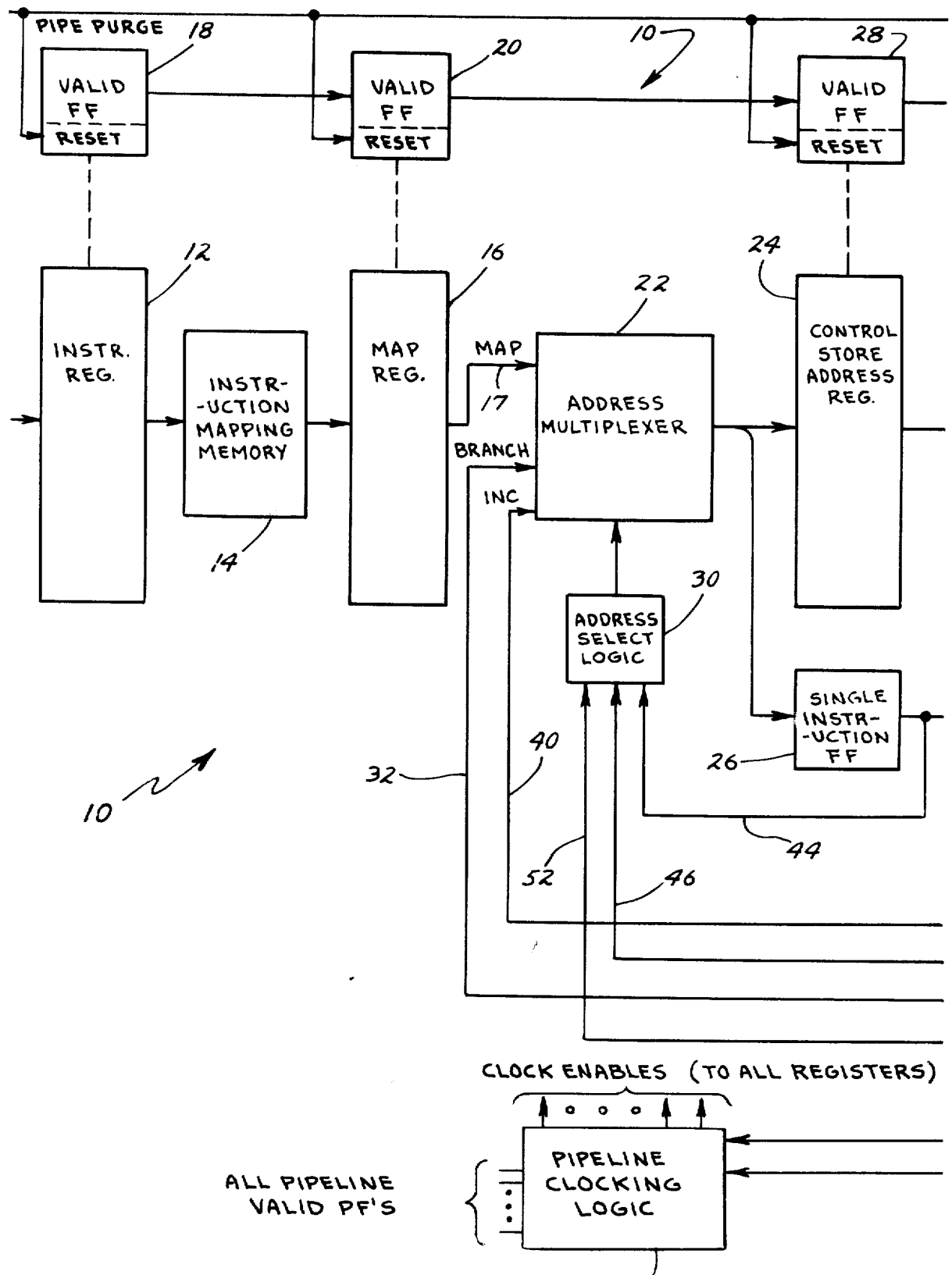
FIGS. 1A and 1B are to be viewed in side by side relationship and are a block schematic diagram of a memory system according to the present invention.
Figure 1B:
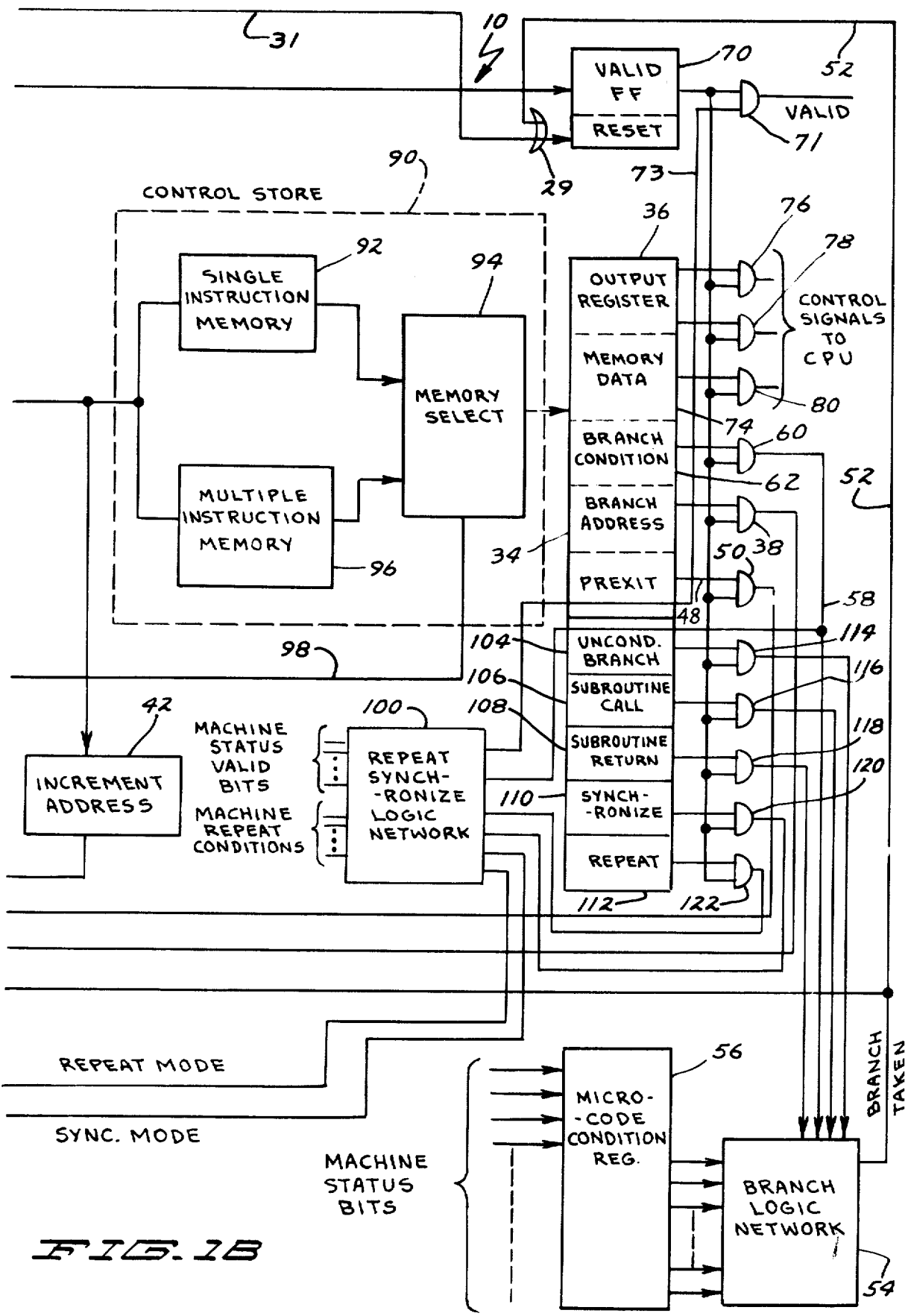

Referring now to FIGS. 1A and 1B, a computer memory control system 10 according to the present invention is shown. Instructions are initially received into the system by an instruction register 12. The instruction register 12 is connected to an instruction mapping memory 14 which in turn is connected to a register 16. A first valid flip-flop 18 is connected with instruction register 12. A second valid flip-flop register 20 is connected with register 16. The output of register 16 comprising a memory map is connected to an address multiplexer 22. The output of address multiplexer 22 is connected to a control store address register 24 and to a single microinstruction flip-flop 26. A third valid flip-flop 28 is connected to the control store address register 24. A pipe purge control line 31 is connected to the reset input of flip-flops 18, 20 and 28. Line 31 also provides an input to OR gate 29 which controls the reset input to flip-flop 70, to be explained later.

An address select logic control network 30 is connected to the address multiplexer 22. Address select logic network control 30 controls the functioning of address multiplexer 22. A first source of addresses for multiplexer 22, as previously described, is the input from register 16. A second source of addresses for multiplexer 22 is from register 16 on data path 17. A second source of input addresses on data path 32 is from the branch address portion 34 of memory data register 36. The branch address portion 34 of the memory data register 36 is output through AND gate 38 and connected to form data path 32. A third input to address multiplexer 22 is from data path 40 which is the increment address furnished by the increment address unit 42.

The address select logic control unit 30 receives three control inputs. The first control input is on control line 44 which is an output from the single microinstruction flip-flop 26. A second input is on control line 46 from PREXIT bit 48 which is part of the sequencing field output of the memory data register 36. The PREXIT bit 48 of register 36 passes through an AND gate 50 before forming control path 46. Finally the third control input to address select control network 30 is on control line 52 which is a control output from the branch logic network 54.

Various machine status bits from the central processing units of the computer, including the pipeline, are provided as input bits to the microcode branch condition register 56 which forms a microcode branch condition operand from the various bits. This microcode branch condition operand is provided as the operand input to the branch logic network 54 to determine whether or not the conditional branch should be taken or not and this output is provided to the output control line 52 from network 54. A control input to network 54 is provided on control line 58 from AND gate 60 which receives as an input the branch condition portion 62 of the memory data register 36. The branch taken control line 52 is connected to the reset input of a fourth valid flip-flop 70 which controls the memory data register 36. An output of the fourth valid flip-flop 70 represents the control input to AND gates 38, 50 and 60 which pass control information inputs as previously described. Flip-flop 70 also provides an input to AND gate 71 which is the output VALID bit used in connection with the synchronize function. The memory data portion 74 of the memory data register 36 is connected through AND gate 80 as control signals to the central processing unit.

The control store 90 of the present system includes a single microinstruction memory 92 which receives an input from the control store address register 24 and has an output connected to the memory select network 94. The multiple microinstruction memory 96 also receives an input from the control store register 24 and provides an output to the memory select network 94. The output of memory select network 94 is connected to the input of the memory data register 36. The memory select network is controlled by a control line 98 which is connected to the output of the single microinstruction flip-flop 26.

As described, the sequencing field portion of register 36 contains the PREXIT bit 48. In addition, there is the unconditional branch bit 104, the subroutine call bit 106, the subroutine return bit 108, the SYNCHRONIZE bit 110 and the REPEAT bit 112. The function of sequence field bits 104, 106 and 108 is clear from the name. AND gates 114, 116, 118, 120 and 122 are associated with and receive inputs from bits 104, 106, 108, 110 and 112, respectively. The other input to AND gates 114, 116, 118, 120 and 122 is provided from flip-flop 70 in the same way as to AND gates 38, 50, 60, 76, 78 and 80. AND gates 114, 116 and 118 provide control inputs to branch logic network 54 to indicate function. AND gates 120 and 122 provide control inputs to a REPEAT/SYNCHRONIZE logic network 100 to indicate the function to be performed. Network 100 receives a plurality of various condition inputs, as shown, relating to machine status valid bits and machine repeat conditions. These conditions might be various flags or other hardware test conditions appropriate to the instruction. A pipeline clocking logic unit 102 receives control inputs from network 100 and sends appropriate clock enable signals to all registers. The pipeline valid flip-flops are also connected to unit 102.

Generally, the invention may be explained as consisting of a system 10 containing a microprogram unit consisting of an address multiplexer, a control store address register, a single microinstruction memory, a multiple microinstruction memory, a single microinstruction flip-flop, a memory select network, an address select logic unit, an increment address unit and a memory data register. Instructions are supplied to the system by the instruction register 12. From the instruction register 12, the instruction opcode addresses the mapping memory 14. The mapping memory 14 provides the control store address of the microcode routine which executes the instruction. This address is then latched into the register 16 to be available to the microprogram unit.

The microprogram unit operates by continuously clocking in control store addresses to generate the appropriate control signals. The sequencing of the microcode is controlled by the address select logic network 30 and the address multiplexer 22. The microcode unit can get its address from the map memory 14 which is used to supply the address of the first microinstruction of an instruction. The map memory 14 also supplies the correct value to be loaded into the single microinstruction flip-flop 26. The map memory output contained in register 16 is selected whenever the single microinstruction flip-flop 26 is a one or the PREXIT control signal from the sequencing register bit 48 on control path 46 is a one. The microcode unit can get its address from the branch input line 32 which is used to supply the address whenever a branch is taken. The branch address is selected whenever the branch taken output of branch logic network 54 on control line 52 is a one.

The microcode unit can also get its address from the increment address unit 42. In this way the microcode steps through the memory sequentially. Increment address selection control is the default select condition, the one selected when none of the others are specifically asserted. Each pipeline register rank, such as instruction register 12, mapping register 16, control store address register 24 or memory data register 36 has an associated valid bit. Each of these valid bits are provided by valid flip-flops 18, 20, 28 and 70, respectively. The valid bit means that the data in the rank should be used as valid data. The microinstruction bits in register 36 are all gated with the valid flip-flop 70 and thus no output signals are asserted if the rank is invalid. The invalid condition is that when the output of valid flip-flop 70 is a zero.

There are three specific operation types to describe and the single microinstruction type of operation in the first to be described. In the operation, the last step of a previous instruction causes the address multiplexer 22 to select the map input on line 17. The next clock cycle causes the map address to be latched into the control store address register 24. The single microinstruction flip-flop 26 is also set to one. At the next clock interval, the data read from the control store is latched into the output register 36 and the first address of the next instruction is latched into the control store address register 24. This process then repeats.

The next type of instruction to be described is the sequential multiple microinstruction. In this case, the first control store address of the instruction is latched into the control store address register 24. At this time the single microinstruction flip-flop 24 is set to zero. This address is then read from the control store and also incremented by the single microinstruction flip-flop 26. The next clock interval latches the microinstruction into the output register 36 and also latches the output of the increment address unit 42 as the next control store address. Thus the execution of multiple microinstructions consists of stepping sequentially from the first address provided. The instruction is ended by setting the PREXIT bit on control line 46 to be a one in the next to last microinstruction. This causes the address multiplexer 22 to select the map input during the next clock, thus initiating the next instruction.

The last type of instruction to be discussed is the sequential multiple microinstruction with conditional branching. In some instructions, the microcode which executes the instruction must make conditional decisions based on certain machine state bits. This microprogram control unit is capable of branching on any one of the bits in the microcode branch condition register 56. The microinstruction sequence fields specifies what branch condition will be tested and the branch address will occur if the branch condition is true. The conditional branch method used in this invention is based on prediction. In all multiple microinstruction sequences the normal next address is an incremented address. Thus while a branch decision is being resolved, the microprogram unit is predicting that the branch will not be taken. The effect of the branch being not taken is that the next address will be an increment address. If the prediction is true, then when the branch is resolved, the microcode sequencing simply continues with no delay.

If the branch condition is met, then the prediction of an increment address is wrong and several things must be done. First, the microinstruction that is clocked into the output register 36 as a result of the predicted address must be cancelled, since the branch was actually taken. This cancelling is done by clearing the valid flip-flop 70 with the branch taken signal on line 52. Note that all signals are gated with the valid flip-flop 70 so they are in affect cancelled. It should also be noted that this requires no additional logic, since the valid flip-flops exist in the memory pipeline for purging or clearing registers. Also, the branch address output on line 32 must be gated into the control store address register 24. This is done by the address multiplexer 22 selecting the branch address on line 32. Thus a branch taken, meaning a wrong prediction requires a two clock cycles. By understanding the branch probabilities and having the freedom to define the sense of the branch conditions, it is often possible to obtain a higher frequency of branch not taken, the faster path of resolution. The multiple microinstruction starts from the map address memory 14 and the map address register 16. The instruction executes sequentially through the control store unit 90. When a conditional branch is encountered, if the branch is not taken, sequential execution continues. If the branch is taken, the branch address is loaded into the control store address register 24 and sequential execution begins from there. When the sequence is complete, the pipeline flow of instructions in memory is started again by the PREXIT bit in the next to the last microcode being set to a one. This look-ahead feature causes the pipeline to start at the correct cycle time to supply the next instruction with no time delay.

Even when branches take a decision interval of 2 cycles, only one microinstruction was required not two. Thus, the branches are specified in a single microinstruction. This results in a savings of control store, since each branch requires only a single microinstruction instead of two. Further, the cancellation of the microinstruction resulting from a wrong guess requires essentially no extra hardware, since pipelines require valid bits and purge signals anyway.

The synchronize bit 110 is used in conjunction with conditional branching. It is used to put the machine to Synchronize Mode. In this mode, the next microinstruction, which would normally contain the conditional branch, is held up until the specified branch condition is valid. This ensures that the microcode doesn't use a branch condition until it is valid. This implementation saves control store location and results in faster microcode branching. The repeat bit 112 causes a microinstruction to be repeated until a specified condition occurs. Both the Repeat bit 12 and Synchronize bit 110 operate by controlling network 100 to test its inputs. When the tested condition occurs, either the Repeat or Synchronize control is sent to clock unit 102, as appropriate for control.

I claim:

1. A banked control store (10) for conditional branching in a pipeline computer comprising:

an address multiplexer (22) having input means for receiving original instructions in said pipeline computer, input means for receiving branch instructions, and input means for receiving increment instructions together with logic means for controlling the selection of an output of said address multiplexer said address multiplexer being responsive to said inputs to alter said original instructions in response to a predetermined condition, a control store address register means (24) for receiving the output of said address multiplexer, a single microinstruction memory means (92) for receiving the output from said control store address register and for producing a first microinstruction for controlling said pipeline computer as a memory output, a multiple microinstruction memory means (96) for receiving the output from said control store address register and for producing a second microinstruction for controlling said pipeline computer as a memory output, a memory select means (94) for receiving the outputs of said single microinstruction memory and said multiple microinstruction memory and having an output consisting of a selected memory output which is selected from said first microinstruction or said second microinstruction, an output register means (34, 36, 48, 62, 74) for said memory select means, a single microinstruction flip-flop (26) having an output for controlling said memory select means said flip-flop receiving an output from said address multiplexer, a branch logic (54) network for producing a control output which is provided to said address multiplexer to cause said address multiplexer to alter said original instructions, means for providing branch condition inputs (56) to said branch logic network, instruction register means for receiving program instructions, instruction mapping memory means for receiving instructions from said instruction register means, instruction map register means for receiving the output of said instruction mapping memory means and connected to said input means for receiving original instructions of said address multiplexer, and first through fourth valid flip-flops associated, respectively, with said instruction register means, said instruction map register means, said control store address register means and said output register means, and wherein said first through fourth valid flip-flops control purging of said register means, respectively, and wherein said branch logic network provides a control signal to at least one of said flip-flops in the event a branch is taken to purge the contents of the associated register.

2. The invention of claim 1 wherein said branch logic network is connected to said fourth valid flip-flop and provides a control signal in the event a branch is taken to purge the contents of said output register means.

3. The invention of any one of claims 1 and 2 in which said output register contains a PREXIT output control signal means which is connected with said address multiplexer logic means so that when the next to last microinstruction is produced in a series of sequentially produced microinstructions, the PREXIT control signal is activated to cause an original instruction to be gated to said control store at the proper time to provide an uninterrupted flow of output microinstructions.

4. The invention of any one of claims 1 and 2 in which said output register contains a REPEAT output control signal, and further comprising logic network means for controlling said pipeline to repeat a microinstruction until a predetermined condition occurs, in response to said REPEAT output control signal.

5. The invention of any one of claims 1 and 2 in which said output register contains a SYNCHRONIZE output control signal, and further comprising logic network means for controlling said pipeline to hold back a conditional branch instruction until a predetermined condition occurs, in response to said SYNCHRONIZE output control signal.

* * * * *